Feb. 22, 1966   N. C. ZATSKY ET AL   3,236,108
GYROSCOPE DAMPING MECHANISM
Filed Oct. 2, 1962   2 Sheets-Sheet 1
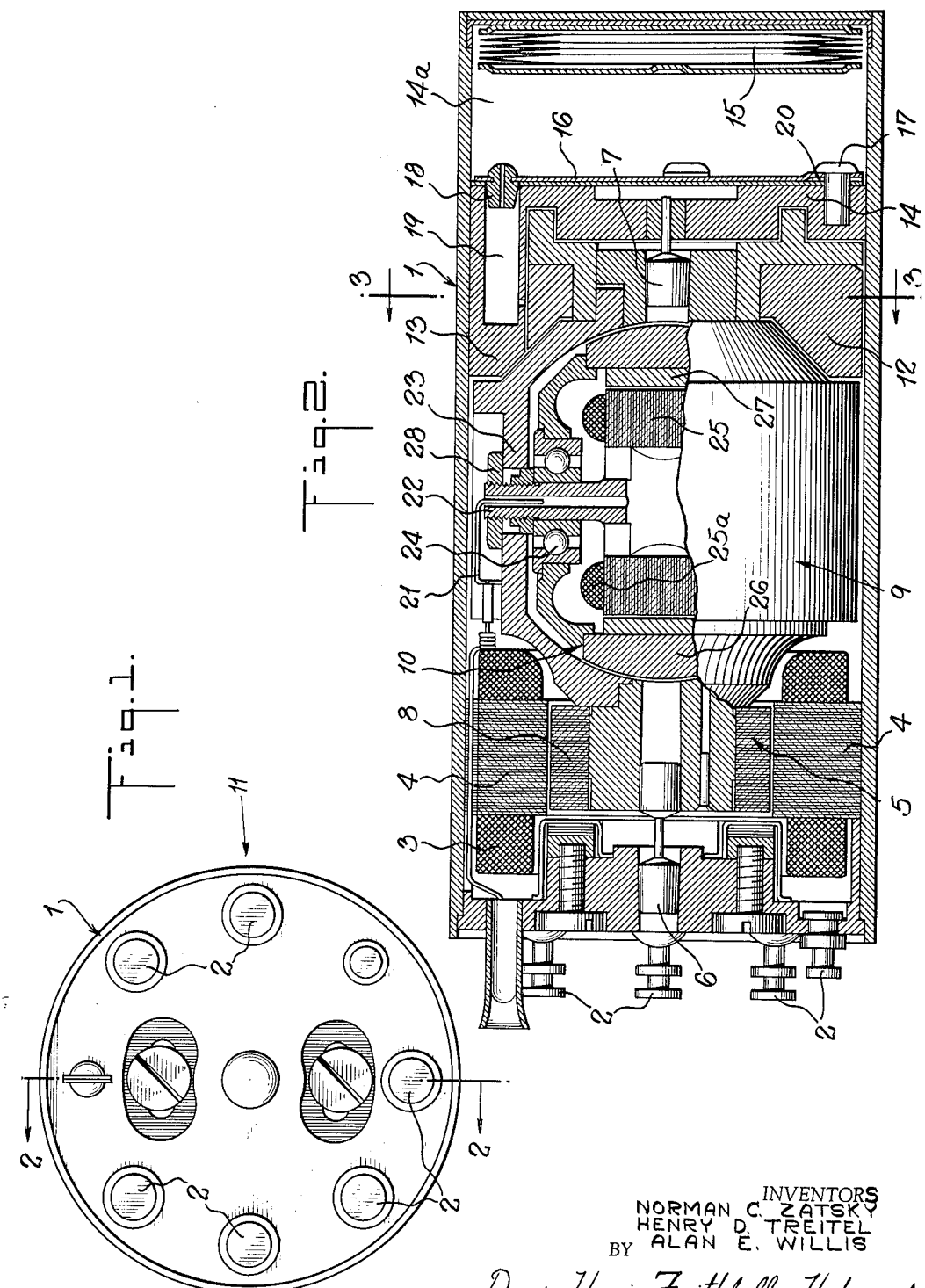
INVENTORS
NORMAN C. ZATSKY
HENRY D. TREITEL
BY ALAN E. WILLIS
Davis, Hoxie, Faithfull + Hapgood
ATTORNEYS Feb. 22, 1966     N. C. ZATSKY ET AL     3,236,108
GYROSCOPE DAMPING MECHANISM
Filed Oct. 2, 1962     2 Sheets-Sheet 2
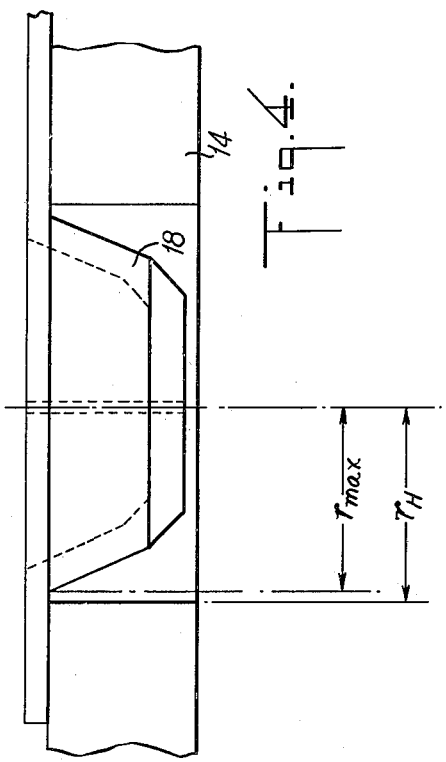
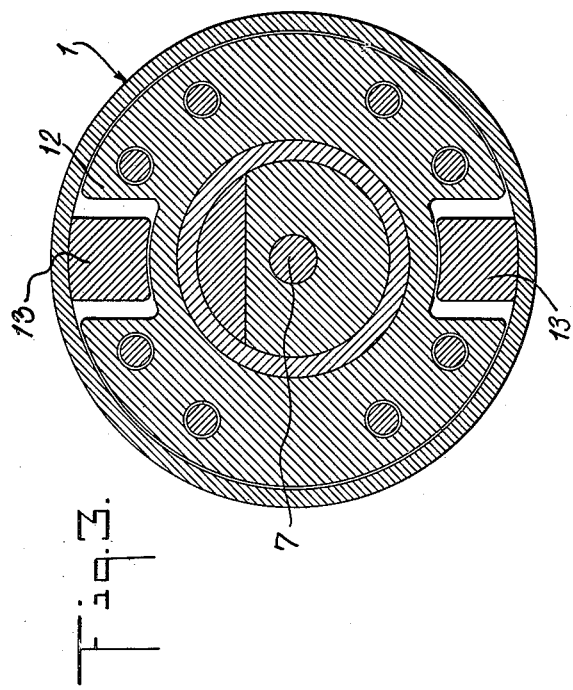

United States Patent Office 3,236,108
Patented Feb. 22, 1966

3,236,108
GYROSCOPE DAMPING MECHANISM
Norman C. Zatsky, Huntington, and Henry D. Treitel, Yorktown Heights, N.Y., and Alan E. Willis, Stamford, Conn., assignors to The United States Time Corporation, Waterbury, Conn., a corporation of Connecticut
Filed Oct. 2, 1962, Ser. No. 227,930
7 Claims. (Cl. 74—5.5)

This invention relates to a gyroscope mechanism and more specifically to a gyroscope damping mechanism which automatically compensates for temperature variations.

In gyroscopes, the main causes of inaccuracy and malfunction are friction and shock of their gimbals (bearings) and oscillations of the moving elements. Oscillation is due to the dominant resonance of inertia along the output axis and the force from the torsion spring suspension of the moving member. A number of methods have been proposed for reducing the shock and friction, including the use of air and magnetic suspension; but the most satisfactory method for many applications has been to partially float the gyroscope unit in a fluid so that it is viscously damped. The fluid reduces oscillations by damping movements within the gyro, lessens friction by floating the moving member and reduces shock, for example due to rapid acceleration.

In many cases, it is desirable that the gyroscope operate over a wide range of temperature environments, for example from −65° F. to 185° F. The fluids which are used for fluid damping, although they are carefully selected and processed, nevertheless present a wide range of viscosity over that temperature range. For example, one fluid widely used in gyroscopes has a 40:1 ratio of viscosity over that temperature range. Fluid damping occurs by the action of moving members of the gyro displacing and shearing the fluid. Both fluid mobility and shear are affected by viscosity.

Various mechanisms have been proposed in order to compensate for the change in viscosity of the damping fluid. In some gyros electrical heaters are used; however, they are bulky, complex and consume precious power. In other gyros, a temperature responsive bellows operates a needle valve which opens and closes an opening between chambers in the gyroscope. A paddle mechanism attached to a moving member in the gyro pumps fluid through the opening in order to dampen its movement. The size of the opening and the viscosity of the fluid determine the resistive force of the fluid against the paddles and therefore the damping. This use of fluid displacement, for the major portion of the damping, is preferable to the use of the fluid shear effect because shear is a function of the first power of the blade size while displacement is a function of the third power of the change of orifice size. For high temperatures when the fluid is thin, the bellows closes the valve so that the opening is small. In this manner the paddles operate against a constant fluid pressure over the temperature range and the damping action is constant. The bellows must be accurate, and consequently are usually relatively expensive, and they take up space, which is often at a premium in aircraft and rockets.

It is an objective of the present invention to provide a viscously damped gyroscope capable of operating after shocks of the order of 1000 g's having an automatic temperature compensating mechanism, which mechanism is relatively inexpensive, operates principally by displacement of fluid, is accurate over a broad range of temperatures, and which utilizes a minimum of moving parts so that it is rugged, small, highly reliable, and long lived.

In accordance with the present invention, a plastic paddle is attached to the moving member of the gyroscope to pump fluid within the gyro case. The paddle member is in the form of a plurality of grooves in a circular member having a certain precision fit within the cylindrical case of the gyroscope. A fluid path is provided by the gap between the plastic member and the case. Expansion of the plastic narrows the gap so that the resistance force of the fluid upon the paddles is responsive to temperature.

As another compensation device, a bimetallic arm is affixed to a chamber wall in the gyroscope. A simple plug valve on the end of the bimetallic arm operates, in accordance with temperature variations, to vary an orifice between chambers, which is another fluid path through which the damping fluid is pumped by the moving paddle.

Other objectives of the present invention will be apparent from the following description of a preferred embodiment taken in conjunction with the accompanying drawings, in which:

FIG. 1 is a plan end view showing the top of the gyroscope;

FIG. 2 is a side cut-away view along lines 2—2 of FIG. 1;

FIG. 3 is a view taken along lines 3—3 of FIG. 2 showing the damping paddles;

FIG. 4 is a side view of the valve.

The present invention is described in connection with a hermetically sealed miniature precision rate gyroscope, although it is understood that the damping mechanism may be used with other types of gyroscopes. A rate gyroscope is a gyroscope having a restricted gimbal and a single degree of freedom—that is, the gyroscope gimbal is free to rotate about one axis only. This rate of deviation type of gyroscope is used principally in autopilots, fire control computing and automatic missile controls.

As shown in FIGS. 1 and 2, the gyroscope has a cylindrical case member 1. It weighs about 3½ ounces and is about 1 inch in diameter. A plurality of electrical terminals 2 protrude through the case member 1 at its left end, as seen in FIG. 2. A number of electrical stator coils 3 are fixed relative to case 1, surround magnetic members 4, and are a stator comprising primary and secondary windings. An electric rotor, shown generally at 5, is rotatably attached to the case through a torsion bar 6 which enables the rotor 5 to turn about its axis a short distance and brings the rotor 5 back to its normal position at the end of its excursion. The rotor is fixedly connected to the gimbal assembly 9 and is an integral part of that assembly. A similar torsion bar 7 is utilized at the opposite end of the gimbal assembly so that the axis of the rotor 5 and the gimbal assembly is along the axial center of the torsion bars. A plurality of magnetic bar members 8 are positioned about the left end of the rotor. These bar elements cooperate with the stator coils 3 in order to electrically indicate change of position of the rotor.

The electrical take-off is of the variable reluctance (differential transformer) type and it measures the angular deflection between the rotor and the stator. This gives an accurate indication of the force 11, for example the acceleration force, exerted on the gyroscope. This type of rotary differential transformer pick-off is known in the gyroscope field and can measure minute changes in input angular velocity, although other types of pick-offs such as potentiometers may be utilized with the damping compensation of the present invention.

A motor 10, preferably of the hysteresis synchronous type, is mounted on constant loaded precision ball bearings within the gimbal assembly. The motor, for example, has a normal speed of 24,000 r.p.m., develops an angular momentum of 32,600 gm.-cm.$^2$/sec., and uses a few watts of power.

The motor 10 includes a lead-in wire 21, a stator and shaft assembly 22, a nut 28 holding the shaft 22 to the gimbal case 23, a pair of top and bottom ball bearings 24 whose inner race is attached to the shaft 22, a plurality of fixed magnetic laminations 25 and coils 25a on the shaft 22, a rotor case member 26 attached to the outer race of bearings 24, a hysteresis ring 27 integral with case 26 and a gyro rotor integral with ring 27. The axis of rotation of the motor is perpendicular to the axis of the rotor of the gimbal assembly. The force input into the gyroscope is in the direction perpendicular to FIG. 2, that is, it is along arrow 11 of FIG. 1.

A plastic moving paddle (compensator) 12 is attached to the gimbal assembly 9 and is integral with that assembly. The plastic material is selected so that its expansion due to temperature rise is relatively large compared to the expansion of the stationary paddle 13 over the range of temperature of the device. Preferably this plastic is nylon. The moving paddle 12 cooperates with a stationary paddle 13 in order to provide a pumping or positive displacement of the damping fluid by squeezing the fluid out from between the paddles. There is some minor shear effect which aids the damping. At some elevated temperature the moving paddle will expand to rub and finally sieze on the case. This sets a limit to the temperature range of operation, but is not otherwise harmful. The damping fluid, for example a silicone oil, is all around the gimbal assembly and fills the gyro case. A suitable fluid is one from the 200 series made by Dow Corning. A plate member 14 is affixed to case 1 and provides a support for stationary paddle 13. The plate 14 separates chamber 14a from the rest of the gyro. The chamber is also full of damping fluid. A spring restrained evacuated metal bellows 15 is within chamber 14a. The purpose of the bellows is to maintain hydrostatic pressure in order to prevent air gaps from developing in the fluid due to the fluid's expansion and contraction and prevent fluid leakage due to such expansion. This bellows need not be an accurate altitude adjusted bellows.

A bimetallic arm 16 is attached at one of its ends by rivet 17 to the rear plate (right side) of plate 14. The arm is free to move toward and away from plate 14 under the influence of temperature changes of the fluid. A rivet head 18, having a small hole through it, is attached to the other end of arm 16 as the valve for the orifice formed by channel 19 through plate 14. This head, when the valve is partially or fully closed, is inserted within channel 19. The head has a smaller diameter than the orifice so that it moves freely and with clearance in the orifice, that is, $r_{max}$ is greater than $r_H$, as shown in FIG. 4. The channel is a path of fluid communication between the fluid around the gimbal assembly and the fluid in chamber 14a. The fluid returns through a fixed orifice in plate 14. A spacer 20 is provided between bimetallic arm 16 and plate 14 so that at room temperature the bimetallic arm is held away from plate 14.

Although two mechanisms for compensation have been described, it is understood that one may be used without the other. For example, if a somewhat more restricted temperature range were required, the nylon movable damping paddles may be utilized without the bimetallic arm. In the alternative by the proper proportioning of the hole and the rivet head valve mechanism, the nylon damping mechanism may be omitted and the bimetallic arm used with metal non-expandable moving and fixed paddles.

The gyroscope of the present invention has under tests shown better shock and vibration characteristics than similar gyroscopes utilizing other temperature compensation mechanism.

Modification may be made within the present invention within the scope of the subjoined claims. For example, the materials of the stationary paddle and the moving paddle may be interchanged so that the moving paddle is made of metal and the stationary paddle is made of nylon. The gap, then through which the damping fluid is pumped would in that case be changed by the temperature expansion and contraction of the fixed nylon paddle.

We claim:

1. In a rate gyroscope having a case, a gimbal assembly, and a temperature compensating mechanism comprising in combination,
   a damping fluid in the case,
   a cylindrical rotatable member operatively connected to the gimbal assembly in the case and having an axially aligned channel in its outer surface, the rotatable member being positioned within the case so that a first fluid path is provided between its outer surface and the case, and
   a stationary paddle attached to the case and projecting into the said channel, the said paddle forming two chambers with the sidewalls of the channel, and the said paddle providing a second fluid path between its free end within the channel and the said outer surface of the rotatable member,
   wherein the stationary paddle cooperates with both side walls of the said channel to pump the fluid upon rotation of the rotatable member from one of the said chambers to the other chamber through the said second fluid path, and
   wherein the rotatable member has a high coefficient of expansion relative to that of the case and is self-expandable with a rise in temperature of the fluid, so that the size of the fluid paths are narrowed by the relative expansions of the rotatable member and the case upon such temperature rise.

2. The damping mechanism of claim 1 wherein the outer surface of the rotatable member is plastic.

3. A mechanism as in claim 1 and having an additional compensating mechanism comprising a separate chamber integrally attached to the gyroscope and filled with the damping fluid, a plurality of connecting means having an orifice between the gyroscope and the separate chamber, a bimetallic temperature flexible arm having one of its ends affixed to the case and its other end free to move to or away from the orifice, and a plug attached to the free end of the arm and positioned to enter the orifice and thereby restrict the flow of fluid upon movement of the arm.

4. The mechanism of claim 3 and having a spring loaded expandable bellows in the separate chamber.

5. In a rate gyroscope having a case, a gimbal assembly and a temperature compensating mechanism comprising in combination, a movable member operatively connected to the gimbal assembly, a damping fluid in the case about the movable member, a separate chamber integrally attached adjacent to the case and filled with the damping fluid, fluid connecting means having an orifice between the case and the separate chamber, a movable paddle integrally attached to the movable member of the gyroscope, and a stationary paddle attached to the case to cooperate with the movable paddle to pump fluid to the separate chamber, characterized in that a temperature responsive bimetallic arm having an end attached to the case and a free end having a plug is positioned to change the effective opening of the orifice by means of movement of the plug into the orifice, and the plug has a smaller diameter than the said orifice so that it may move freely and with clearance therein.

6. The mechanism of claim 5 in which a spacer is affixed between the bimetallic arm and the case and positioned to hold the plug away from the orifice at room temperature.

7. In a rate gyroscope having a case, a gimbal assembly, and a temperature compensating mechanism comprising in combination,
   a damping fluid in the case,
   a cylindrical rotatable member operatively connected to the gimbal assembly in the case and having an axially aligned channel in its outer surface, the rotatable member being positioned within the case so that a first fluid path is provided between its outer surface and the case, and a stationary paddle attached to the case and projecting into the said channel, the said paddle forming two chambers with the sidewalls of the channel, and the said paddle providing a second fluid path between its free end within the channel and the said outer surface of the rotatable member, wherein the stationary paddle cooperates with both sidewalls of the said channel to pump the fluid upon rotation of the rotatable member from one of said chambers to the other of said chambers through the said second fluid path, and wherein the stationary paddle has a high coefficient of expansion relative to that of the rotatable member and is self-expandable with a rise in temperature of the fluid, so that the size of the said fluid path between the stationary paddle and the rotatable member is narrowed by the relative expansions of the rotatable member and the stationary paddle upon such temperature rise.

References Cited by the Examiner

UNITED STATES PATENTS

| 2,945,380 | 9/1960 | Pope et al. | 74—5.5 |
| 2,955,471 | 10/1960 | Schwartz et al. | 74—5.5 |
| 2,955,472 | 10/1960 | Krupick et al. | 74—5.5 |

MILTON KAUFMAN, *Primary Examiner.*

BROUGHTON G. DURHAM, *Examiner.*